3,555,150
NIGERICIN FOR TREATING COCCIDIOSIS
Marvin Gorman and Robert L. Hamill, Indianapolis, Ind., assignors to Eli Lilly and Company, Indianapolis, Ind., a corporation of Indiana
No Drawing. Filed Apr. 17, 1968, Ser. No. 721,922
Int. Cl. A61k 21/00
U.S. Cl. 424—122                                                  1 Claim

ABSTRACT OF THE DISCLOSURE

Methods and compositions for controlling coccidiosis employing nigericin as the active anti-coccidiosis agent.

BACKGROUND OF THE INVENTION

This invention relates generally to the prevention and treatment of coccidiosis and more particularly relates to the use of nigericin as a coccidiostat and to novel compositions containing said nigericin or its alkali metal, alkaline earth, ammonium and substituted ammonium salts, including methylamine, dimethylamine, triethylamine, ethylamine, and the like.

Coccidiosis is a common and widespread poultry disease caused by one or more of several species of protozoan parasites of the genus Eimeria such as *E. tenella, E. necatrix, E. acervulina, E. maxima, E. brunetti, E. mivati, E. adenoides,* and *E. maleagrimitis*. *E. tenella* is the causative agent of a severe and often fatal infection of the caeca of chickens, which is manifested by severe and extensive hemorrhage, accumulation of blood in the caeca, and the passage of blood in the droppings. *E. necatrix* attacks the small intestine of the chick causing intestinal coccidiosis. *E. maleagrimitis* and *E. adenoides* are causative organisms of coccidiosis in turkeys.

When left untreated, the severe infections of coccidiosis lead to poor weight gain, reduced feed efficiency and high mortality in fowl. The morbidity and mortality occasioned by coccidiosis infections create extensive economic loss when such infections are left untreated or unchecked. The elimination or control of this disease is, therefore, of paramount importance to the poultry raising industry.

SUMMARY

Nigericin has been reported in the literature as an antibiotic having antibacterial activity. (Harnes et al., 1951. "Nigerisin, a New Crystalline Antibiotic from an Unidentified Streptomyces." Antibiotics and Chemotherapy 1: 594–596.) We have now found that nigericin and its alkali metal, alkaline earth, and ammonium salts are active against protozoa which cause coccidiosis and hence are useful as coccidiostats when small amounts of the compounds are fed to poultry.

We have also found that, based on physical, chemical, and chromatographic data, four separately reported antibiotics appear to be the same as nigericin. They are: (1) Helixin C, (Smeky et al., 1952. "Production and Purification of the Antibiotic, Helexin." Phytopath. 42: 505–510); (2) Antibiotic X464, (Berger et al., 1951. "The Isolation of Three Crystalline Antibiotics from Streptomyces." J. Am. Chem. Soc. 73: 5295–5298); (3) Antibiotic K178, (Horvath et al., 1964. "Antibiotics Produced by Streptomyces III. A New Antibiotic K178; Biological Studies." Z. Allgem. Microbiol. 4: 236–241); and (4) Azalomycin M., Japanese Patent 13,791, issued 1966.

Thus, for the purpose of our invention, the term nigericin encompasses the antibiotics variously known as nigericin, helexin C, antibiotic X464, antibiotic K178 and azalomycin M.

It is a primary object of this invention to provide a new method for preventing and controlling coccidiosis infections in poultry. It is a further object to provide novel compositions which, when added to animal feedstuffs, are effective in preventing clinical coccidiosis. A still further object is to provide animal feedstuffs containing nigericin. Other objects will become apparent from the ensuing discussion of the invention.

DESCRIPTION OF THE PREFERRED EMBODIMENTS

In accordance with the present invention, we have discovered that nigericin, its alkali metal, alkaline earth, and basic nitrogen salts such as ammonium salts are potent coccidiostats, which, when administered to poultry, arrest the development of coccidiosis and hence are prophylactic agents in controlling coccidiosis. Our new coccidiostats are conveniently fed to poultry as a feed component, although they may also be dissolved or suspended in the drinking water. According to a preferred embodiment, novel compositions are provided which comprise nigericin intimately dispersed in or intimately admixed with an edible, inert, solid carrier or diluent to provide a premix or medicated food supplement. An inert edible carrier or diluent is one that is nonreactive with respect to nigericin. The carrier or diluent is preferably one that is or may be an ingredient of animal feed.

The preferred compositions of our invention are feed premixes in which nigericin is present in relatively large amounts and which are suitable for addition to the poultry feed either directly or after an intermediate dilution or blending step. Examples of carriers or diluents suitable for such compositions are animal feed ingredients such as distillers' dried grains, soybean mill run, alfalfa granules, wheat middlings, exfoliated hydrobiotites, corn meal, citrus meal, fermentation residues, ground oyster shells, Attapulgus clay, wheat shorts, molasses solubles, corn cob meal, edible vegetable substances, toasted dehulled soya flour, soybean feed, soybean mill feed, antibiotic mycelia, soya grits, kaolin, talc, crushed limestone and the like. The preferred diluents are soybean products such as soybean mill run and soybean feed, and alfalfa products such as alfalfa granules.

The compositions can be prepared by intimately dispersing or admixing nigericin as the pure compound, a salt, the mycelial cake or the dried broth throughout the solid inert carrier by methods such as grinding, stirring, milling or tumbling, although, in some instances, it may be adsorbed on the carrier by spraying a solution of nigericin into a rotating mill containing the diluent. By selecting proper diluents and by altering the ratio of carrier to active ingredient, compositions of any desired concentration can be prepared.

The feed premixes can be formulated so that the total active ingredient is present within the range of 10 percent to 80 percent by weight and the diluent or carrier present is correspondingly within the range of 90 percent to 20 percent by weight of the premix. The preferred ratio is about 40 percent by weight of nigericin to about 60 percent by weight of the diluent. The premixes may be further diluted with an animal feed supplement or may be added directly to an animal feedstuff in order to provide a suitable medicated feedstuff which can be eaten directly by poultry.

The feed supplement may be further diluted with materials such as corn meal or soybean meal before being incorporated in the animal feed. This dilution serves to facilitate uniform distribution of the coccidiostats in the finished feed. The finished feed is one that contains a source of fat, protein, carbohydrate, minerals, vitamins and other nutritional factors.

In the treatment of coccdiosis infections, relatively low levels of nigericin in poultry feed are sufficient to afford the poultry good protection against coccidosis. The compound is administered to chickens in an amount equal to about 0.005 to 0.04 percent by weight of the daily feed intake. The preferred range is from 0.015 to 0.03 percent with the optimum results being obtained when about 0.02 percent or 0.04 lb./ton of nigericin is incorporated into the poultry feed. The most advantageous dosage level will, of course, vary somewhat with particular circumstances such as the type and severity of the coccidial infection to be treated, the daily feed intake of the birds, and the like.

Prior to administration of the medicated feed to poultry, the premix is uniformly dispersed in the animal feed by suitable mixing or blending procedures.

In the above discussion of our invention, emphasis has been placed on solid compositions wherein the active ingredient is mixed with an edible carrier in a premix, or in the final poultry feedstuff.

An alternative method of treatment is to administer a solution or suspension containing a therapeutically effective amount of nigericin or one of its salts in the drinking water of the poultry. The quantity of the coccidiostat which can be administered in this fashion is, of course, limited by the solubility of nigericin in water or by the quantity that can be suspended in the water without undue settling. Emulsifiers or surfactants can be employed in order to increase the amount of nigericin which may be suspended in solution.

In treating poultry according to the method of our invention, one-day-old chicks are started on the medicated feed containing nigericin. This procedure applies for both broilers and for replacement stock for layer flocks. Broiler birds are maintaind on the medicated feed of this invention throughout their life, and the medicated feed is withdrawn prior to slaughter. Replacement stock for layer flocks are maintained on our medicated feed for a minimum of twelve to fourteen weeks.

Generally speaking, nigericin or one of its salts is added to a conventional basal ration which can comprise the following ingredients: meat and bonescrap; fish meal, vitamin $B_{12}$; poultry by-product meal; dehulled soybean oil meat; dehydrated alfalfa meal; corn gluten meal; pulverized oats; ground barley; cornmeal; wheat middlings; dried grain and whey fermentation solubles; methionine hydroxy analogue calcium; riboflavin; calcium pantothenate; choline chloride; niacin; animal fat; menadione sodium bisulfite; vitamin E supplement; butylated hydroxytoluene; vitamin A palmitate; D-activated animal sterol; calcium carbonate; defluorinated phosphate; salt; calcium iodate; manganese oxide: zinc oxide; cobalt hydroxide; and cobalt carbonate.

A medicated feed composition is prepared by adding nigericin to the basal ration in an amount constituting 0.02 percent by weight of the final mixture. The ingredients are thoroughly admixed to provide the ration which is fed to young chicks.

The following examples will further illustrate the compositions of this invention.

EXAMPLE 1

Animal feed premixes having the following compositions are prepared by intimately mixing nigericin and the particular edible solid diluent or diluents:

| Constituents: | Parts by weight |
|---|---|
| (A) Nigericin | 50 |
| Alfalfa granules | 50 |
| (B) Nigericin | 40 |
| Molasses solubles | 60 |
| (C) Nigericin | 30 |
| Corn distillers' dried grains | 70 |
| (D) Nigericin, ammonium salt | 40 |
| Corn germ meal | 30 |
| Corn distillers' dried grains | 30 |
| (E) Nigericin, sodium salt | 60 |
| Soybean mill feed | 40 |
| (F) Nigericin, calcium salt | 20 |
| Corn distillers' dried grains | 60 |
| Wheat shorts | 20 |
| (G) Nigericin | 80 |
| Wheat shorts | 20 |
| (H) Nigericin | 25 |
| Soybean feed | 75 |

These premixes are made by mechanical milling or mixing of the ingredients to insure uniform distribution of the active compound.

EXAMPLE 2

A suitable medicated starter feed for broiler chicks can be prepared by mixing 0.02 percent by weight (0.4 lb./ton) of nigericin into a typical starter ration having the following composition:

BROILER STARTER

| Ingredients | Percent | Lbs./ton |
|---|---|---|
| Corn, yellow, ground | 58.0 | 1,160 |
| Soybean oil meal, solvent extracted dehulled (50 percent) | 18.0 | 360 |
| Corn Gluten Meal (60 percent) | 5.0 | 100 |
| Distillers' dried solubles, corn | 5.0 | 100 |
| Fish meal with solubles | 5.0 | 100 |
| Meat scraps (55 percent) | 4.0 | 80 |
| Alfalfa meal, dehydrated (17 percent) | 2.0 | 40 |
| Animal fat, beef tallow | 1.0 | 20 |
| Dicalcium phosphate, feed grade | 0.6 | 12 |
| Calcium carbonate (ground limestone) | 0.5 | 10 |
| Salt (NaCl) | 0.3 | 6 |
| Trace mineral premix AN-01 (1.05) [1] | 0.1 | 2 |
| Vitamin premix CK-01 (1.02) [2] | 0.5 | 10 |
| Total | 100.0 | 2,000 |

[1] Trace mineral premix provides per pound complete feed: manganese, 30.4 mg.; zinc, 34.0 mg.; iron, 7.7 mg.; copper, 0.8 mg.; and iodine, 0.4 mg.
[2] Vitamin premix provides per pound complete feed: vitamin A, 2250 IU; vitamin $D^3$, 600 ICU; vitamin E, 5 IU; menadione sodium bisulfite, 0.5 mg.; riboflavin, 2 mg.; niacin, 18 mg.; pantothenic acid, 4.8 mg.; choline, 130 mg.; and vitamin $B^{12}$, 5 mcg.

After four weeks, the broiler chicks are changed to a suitable medicated feed which is prepared by mixing 0.02 percent by weight of nigericin into a typical finisher ration having the following composition:

BROILER FINISHER

| Ingredients | Percent | Lbs./ton |
|---|---|---|
| Corn, yellow, ground | 62.8 | 1,256 |
| Soybean oil meal, solvent extracted dehulled (50 percent) | 28.7 | 574 |
| Animal fat, beef tallow | 5.2 | 104 |
| Dicalcium phosphate, feed grade | 1.5 | 30 |
| Calcium carbonate (ground limestone) | 0.75 | 15 |
| Salt (NaCl) | 0.25 | 5 |
| Trace mineral premix AN-01 (1.05) [3] | 0.1 | 2 |
| Vitamin premix CK-01 (1.02) [4] | 0.5 | 10 |
| Methionine hydroxy analogue (90 percent) | 0.2 | 4 |
| Total | 100.0 | 2,000 |

[3] See 1 supra.
[4] See 2 supra.

The broilers are maintained on the above medicated diet or one comparable thereto until slaughtered.

EXAMPLE 3

To control coccidiosis in layer stocks, the chicks are started on a suitable medicated starter feed prepared by mixing about 0.2 percent by weight of nigericin into a typical starter ration having the following composition:

CHICK STARTER
[0 to 6 weeks]

| Ingredients | Percent | Lbs./ton |
|---|---|---|
| Corn, yellow, ground | 55.0 | 1,100 |
| Wheat middlings | 10.0 | 200 |
| Soybean oil meal, solvent extracted dehulled (50 percent) | 19.0 | 380 |
| Meat scraps | 5.0 | 100 |
| Distillers dried solubles, corn | 2.5 | 50 |
| Fish meal with solubles | 2.5 | 50 |
| Alfalfa meal, dehydrated (17 percent) | 2.2 | 44 |
| Whey, whole, dried | 1.5 | 30 |
| Dicalcium phosphate, feed grade | 0.5 | 10 |
| Calcium carbonate (ground limestone) | 0.75 | 15 |
| Salt (NaCl) | 0.25 | 5 |
| Trace mineral premix AN-01 (1.05) [5] | 0.1 | 2 |
| Vitamin premix CK-01 (1.02) [6] | 0.5 | 1 |
| Methionine hydroxy analogue (90 percent) | 0.2 | 0 |
| Total | 100.0 | 2,000 |

[5] See 1 supra.
[6] See 2 supra.

After six weeks, the replacement layer chicks are changed to a feed containing 0.2 percent by weight of nigericin and having the formula:

PULLET GROWER
[6 to 12 weeks]

| Ingredients | Percent | Lbs./ton |
|---|---|---|
| Corn, yellow, ground | 66.0 | 1,320 |
| Soybean oil meal, solvent extracted dehulled (50 percent) | 12.0 | 240 |
| Wheat middlings | 10.0 | 200 |
| Meat scraps | 5.0 | 100 |
| Alfalfa meal, dehydrated (17 percent) | 2.4 | 48 |
| Fish meal with solubles | 1.5 | 30 |
| Distillers' dried solubles, corn | 1.2 | 24 |
| Dicalcium phosphate, feed grade | 0.4 | 8 |
| Calcium carbonate (ground limestone) | 0.4 | 8 |
| Salt (NaCl) | 0.25 | 5 |
| Trace mineral premix AN-01 (1.05) [7] | 0.1 | 2 |
| Vitamin premix CK-01 (1.02) [8] | 0.5 | 10 |
| Methionine hydroxy analogue (90 percent) | 0.25 | 5 |
| Total | 100.0 | 2,000 |

[7] See 1 supra.
[8] See 2 supra.

At twleve weeks and beyond, nigericin is combined in a typical feed having the following formula:

PULLET DEVELOPER
[12 to 22 weeks]

| Ingredients | Percent | Lbs./ton |
|---|---|---|
| Corn, yellow, ground | 66.0 | 1,320 |
| Oats, ground | 15.00 | 300 |
| Soybean oil meal, solvent extracted dehulled (50 percent) | 11.00 | 220 |
| Fish meal with solubles | 2.50 | 50 |
| Alfalfa meal, dehydrated (17 percent) | 2.15 | 43 |
| Dicalcium phosphate, feed grade | 1.50 | 30 |
| Calcium carbonate (ground limestone) | 0.75 | 15 |
| Salt (NaCl) | 0.25 | 5 |
| Trace mineral premix AN-01 (1.05) [9] | 0.10 | 2 |
| Vitamin premix CK-01 (1.02) [10] | 0.50 | 10 |
| Methionine hydroxy analogue (90 percent) | 0.25 | 5 |
| Total | 100.0 | 2,000 |

[9] See 1 supra.
[10] See 2 supra.

EXAMPLE 4

Four groups of five nine-day-old chicks were fed a mash diet containing nigericin, at each of the concentrations indicated below, uniformly dispersed in the feed. After having been on this ratio for 48 hours, each bird was infected with 200,000 sporulated oocysts of *E. tenella*. Four other groups of five non-day-old chicks were fed a similar mash containing no nigericin. These were also infected after 48 hours and served as positive controls. Four other groups of five nine-day-old chicks were fed the mash diet free of nigericin and were not infected with coccidiosis. These served as normal controls. The chickens were maintained on the above diet for seven days. The results of the treatment were evaluated seven days after infection. The following results were obtained.

| | Percent in feed | Percent mortality | Total weight gain (g.) | Feed efficiency | Survivor average weight gain (g.) |
|---|---|---|---|---|---|
| Nigericin | 0.04 | 5 | 1,559 | 2.35 | 86 |
| | 0.02 | 0 | 2,126 | 2.09 | 106 |
| | 0.01 | 15 | 1,319 | 3.20 | 93 |
| | 0.005 | 20 | 866 | 4.67 | 77 |
| Infected control | | 80 | −732 | | 68 |
| Normal control | | 0 | 2,945 | 1.69 | 147 |

It will be apparent to those skilled in the art that the coccidiostat of this invention can be incorporated into special feed concentrate and supplement formulations and finished animal feeds containing vitamins, antibiotics, growth-promoting agents, and other nutritional substances.

It will also be apparent to those skilled in the art that the coccidiostats of this invention may be used either alone or in combination with one or more other coccidiostats. That is, poultry can be treated with compositions having nigericin or one of its salts as the sole coccodiostat or treatment can be initiated wherein nigericin or one of its salts and one or more other coccidiostats are administered concurrently. For such purposes, nigericin can be admixed with one or more other coccidiostats including but not limited to the following: 3,5-dinitro-o-toluamide; 3,5-dichloro - 2,5 - dimethyl-4-pyridinol; 1-(4-amino-2-n-propyl - 5 - pyrimidinylmethyl)-2-picolinium chloride, hydrochloride; ethyl 4-hydroxy-6,7-diisobutoxy-3-quinolinecarboxylate; 7-benzyloxy-6-n-butyl - 3 - methoxycarbonylquinol-4-one; ethyl 4-hydroxy-6-n-decyloxy-7-ethoxyquinoline-3-carboxylate; 2,4-diamino - 5 - (3,4-dimethoxybenzyl)pyrimidine; 2 - chloro-4-nitrobenzamide; sulfaquinoxaline; other sulfa compounds; 4,4'-dinitrocarbanilide-2-hydroxy - 4,6 - dimethylpyrimidine complex; 3,3'-dinitrodiphenyldisulfide; arsanilic acid; 3-amino-4-hydroxyphenylarsonic acid; 5-nitrofurfural semicarbazone, and the 6,7 - dialkoxy-4-hydroxyquinoxaline-3-carboxylic acid esters.

We claim:

1. A method for controlling coccidiosis infections in poultry which comprises feeding said infected poultry with an anti-coccidiosis effective amount of nigericin.

References Cited

Shumard et al., Abstracts of Papers, 17th Interscience Conference on Antimicrobial Agents and Chemotherapy, Chicago, Ill., Oct. 25-27, 1967, p. 19, No. 41.

Goldbreg, Antibiotics, D. Van Nostrand Co. Inc., New Jersey, 1964, p. 178.

Harned et al., Antibiotics and Chemotherapy, vol. 1, No. 9, December 1951, pp. 594-6.

Derwent Farndoc #22,463, Jap. patent 13,791, issued Aug. 2, 1966, pp. 19 and 20.

JEROME D. GOLDBERG, Primary Examiner